United States Patent
Slotta (10) Patent No.: US 6,621,485 B1
(45) Date of Patent: *Sep. 16, 2003

(54) GEL CUSHION FOR KEYBOARD CURSOR CONTROL STICK

(75) Inventor: Mark R. Slotta, Highland, MI (US)

(73) Assignee: GIV, LLC, Highland, MI (US)

( * ) Notice: Subject to any disclaimer, the term of this patent is extended or adjusted under 35 U.S.C. 154(b) by 267 days.

This patent is subject to a terminal disclaimer.

(21) Appl. No.: 09/703,041

(22) Filed: Oct. 31, 2000

Related U.S. Application Data (60) Continuation-in-part of application No. 09/281,126, filed on Mar. 29, 1999, now Pat. No. 6,140,998, which is a division of application No. 08/717,220, filed on Sep. 26, 1996, now Pat. No. 5,889,508.

(51) Int. Cl.$^7$ ................................. G09G 5/00
(52) U.S. Cl. ............... 345/168; 345/156; 345/157; 345/158; 345/159; 345/160; 345/161; 345/162; 345/163; 345/164; 345/165; 345/166; 345/167; 345/169; 345/170; 345/171; 345/172
(58) Field of Search ................. 345/156–172

(56) References Cited

U.S. PATENT DOCUMENTS

| | | | |
|---|---|---|---|
| 3,898,397 A | | 8/1975 | Devore et al. |
| 4,190,697 A | * | 2/1980 | Ahrens ................. 428/315 |
| 4,565,460 A | | 1/1986 | Kline |
| 5,087,904 A | | 2/1992 | DeVolpi |
| 5,290,115 A | | 3/1994 | Little |
| 5,407,285 A | | 4/1995 | Franz |
| 5,488,206 A | * | 1/1996 | Wu ...................... 200/6 A |
| 5,504,502 A | * | 4/1996 | Arita et al. ............. 345/160 |
| 5,568,987 A | | 10/1996 | Franz |
| 5,570,112 A | | 10/1996 | Robinson |
| 5,670,988 A | | 9/1997 | Tickle |
| 5,694,123 A | | 12/1997 | Selker et al. |
| 5,701,142 A | | 12/1997 | Brown et al. |
| 5,708,562 A | | 1/1998 | Agata et al. |
| 5,712,660 A | * | 1/1998 | Martin .................. 345/161 |
| 5,798,754 A | | 8/1998 | Selker et al. |
| 5,870,082 A | | 2/1999 | Selker et al. |
| 5,889,507 A | * | 3/1999 | Engle et al. ............ 345/161 |
| 5,889,508 A | | 3/1999 | Slotta |
| 6,019,534 A | | 2/2000 | Heins |
| 6,040,758 A | | 3/2000 | Sedor et al. |
| 6,057,540 A | | 5/2000 | Gordon et al. |
| 6,135,476 A | | 10/2000 | Dickie et al. |
| 6,140,998 A | | 10/2000 | Slotta |
| 6,239,786 B1 | | 5/2001 | Burry et al. |
| 6,271,834 B1 | * | 8/2001 | May et al. ............... 345/168 |
| 6,353,431 B1 | | 3/2002 | Poole et al. |
| 6,390,423 B1 | * | 5/2002 | Danzyger et al. ........ 248/118 |
| 6,400,354 B1 | * | 6/2002 | Pin-Chen .............. 345/161 |

OTHER PUBLICATIONS

IBM Think Pad 750 and 750C User's Manual, pp. 4–27 through 4–29, dated prior to invention.

(List continued on next page.)

Primary Examiner—Richard Hjerpe
Assistant Examiner—Jennifer T. Nguyen
(74) Attorney, Agent, or Firm—MacMillan, Sobanski & Todd, LLC

(57) ABSTRACT

A gel cushion that can be attached to an existing cursor pointing device (control stick) on a computer or keyboard, or be integrally formed with the cap during manufacture. The gel cushion is flexible enough to prevent tissue damage to the user's fingers due to repetitive motions over an extended period of use, yet firm enough to transmit the desired pressure to the control stick. The gel cushion designed to be used on an existing control stick can be applied with an adhesive to a cap, or with a frictional fit directly to the control stick. The gel cushion is designed to be easily installed and replaced when worn.

10 Claims, 5 Drawing Sheets

OTHER PUBLICATIONS

Santoprene Thermoplastic Rubber. Datasheet [online]. Advanced Elastomer Systems, L.P. [retrieved on Oct. 30, 2000]. Retrieved from the InternetURL:www.santoprene.com/aes/santoprene.html.

TPE Applications for Broad Industry Needs. Information sheet [online]. Advanced Elastomer Systems, L.P. [retrieved on Oct. 30, 2000]. Retrieved from the InternetURL:www.santoprene.com/aes/applicaions.html.

* cited by examiner

GEL CUSHION FOR KEYBOARD CURSOR CONTROL STICK

"CROSS-REFERENCE TO RELATED APPLICATIONS

This application is a Continuation-In-Part of Application No. 09/281,126 filed Mar. 29, 1999, now U.S. Pat. No. 6,140,998, which was a Divisional of Application No. 08/717,220 filed Sep. 26, 1996, now U.S. Pat. No. 5,889,508."

BACKGROUND OF THE INVENTION

This invention relates in general to a computer input device, and in particular to a cursor pointing device (cursor control stick), of a notebook-type portable computer or similar device.

A finger mouse or cursor control stick, as used in this application, is a man-machine interface device which controls the motion of a computer display cursor. In particular, a control stick is a type of miniature joy stick which is intended to be operated by the tip of one finger of the user.

Typically, a control stick is mounted in a central location on a computer keyboard, such as between the "G", "H" and "B" keys on a standard "QWERTY"-type keyboard. The control stick has a position sensing mechanism which detects horizontal pressure in any horizontal direction. The cursor moves in a direction that corresponds to the direction of pressure exerted on the control stick and, in some embodiments, at a speed that corresponds to the amount of pressure exerted on the control stick. The control stick includes an elongated shaft. The shaft of the control stick has a small diameter, thus allowing the control stick to be mounted between the keys of the computer keyboard without causing the placement of the keys to vary greatly from that expected by an experienced user. A cap is typically removably mounted on the upper end of the control stick shaft, in order to provide an enlarged contact surface for a user to press against on the small diameter shaft of the control stick.

SUMMARY OF THE INVENTION

Some models of control sticks have a cap with a hard smooth surface, which became slippery during use from perspiration or a build-up of natural body oils. Thus a user has to press their finger with relatively great force against the cap to prevent their finger from slipping on the surface of the cap. The need to press hard on the cap makes control difficult, since the user cannot use the finesse and delicate movements typically needed for rapid, accurate cursor movement. Also, pressing hard on the control stick is physically tiring to the finger, hand and forearm muscles of a user, and caused irritation, inflammation, and bruising of the finger tissue after a period of extended use.

A period of extended use, as used in this application, means a period of use of more than about one hour, and generally more than four hours and less than twelve hours. During such period of use, the user frequently manipulates the control stick. The frequency of manipulation of the control stick during a representative task, such as word processing, will typically be at least every ten minutes, on average, and may be much more frequently, depending on the particular task and the particular user.

Another type of a cap for a control stick has a textured outer surface. For example, one known control stick is equipped with a cap which is stippled with bumps which are about the same size and spacing as the abrasive on 150 grit sandpaper. While this approach may help prevent the slipping common with the earliest model cap, the textured cap is still irritating to the finger of a user when used extensively, even with the lighter touch allowed by the textured surface. The uneven and relatively hard surface of such caps still can cause inflamed tissue, bruising, soreness and finger fatigue in users which limits their ability to comfortably use such a control stick for periods of extended use.

The present invention provides a "cushioned" cap for a control stick, which cap may suitably may be formed at least partially of a gel material, with a surface which provides the needed finger to cap friction to easily use the control stick to move the cursor with a light touch, and which is formed of a relatively soft material so that the cap does not irritate the body tissues of the user or result in finger fatigue, even after periods of extended use.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Referring now to the drawings, FIGS. 1 through 6 illustrate a first embodiment of a control stick, indicated generally at 10, according to this invention. The illustrated control stick 10 is a miniature joy stick, such as the TrackPoint, TrackPoint II, or TrackPoint III control sticks on notebook computers sold by the International Business Machines Corporation. However, it will be appreciated, in light of the following disclosure, that the invention may be practiced on control devices other than such miniature joy sticks.

Figure 1:
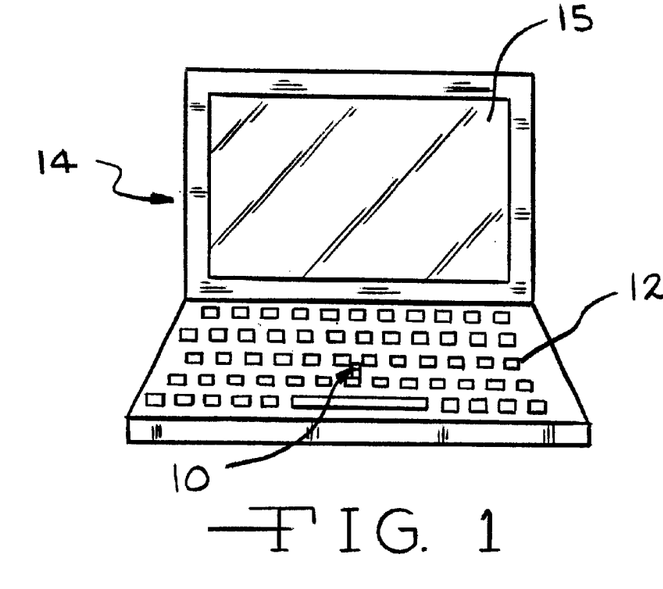
FIG. 1 is a perspective view of a typical portable computer employing a control stick having a cushioned cap in accordance with this invention.

The control stick 10 is mounted in a keyboard 12 of a typical notebook-style microcomputer 14 having a pivotally mounted video screen 15. The control stick 10 is mounted at a first end (not shown) to the microcomputer 14, between the keys of the keyboard 12. A cap 18 is removably mounted on the other end 21 of the control stick 10. The control stick 10 is usually made of a plastic material, and translates the pressure on the cap 18 into a command to move a cursor on a video display of the computer 14.

The cap 18 of the control stick 10 is made of a relatively hard elastomeric material. At least a central portion of the outer surface 17 of the cap 18 is provided with an attached cushion 20. The cushion 20 can be made of any resilient material that can be attached to the outer surface 19 of the cap 18.

Examples which may be suitable materials include soft rubber, soft foam, and polyurethane foam. The preferred material for the cushion 20 is polyurethane foam such as the type used in expandable ear plugs. This type of foam product provides a surface that is relatively soft so as to not damage the tissues in the finger of a user during periods of extended use.

Hardness can be characterized by measuring the force applied to a given area which is required to compress or deflect a material a given distance. For example, a typical prior art cap, such as a cap supplied with the TrackPoint II control stick, is made of a relatively hard elastomeric material. During testing, a probe having a contact surface of approximately 1 $mm^2$ was pressed against such a cap to cause the probe to deflect the surface of the cap approximately 0.25 mm. A force of approximately 15 grams was required to compress the surface of the cap inwardly this small amount. In contrast, one embodiment of the cushion 20 of the present invention required a force of only 5 grams to be exerted by the probe to compress the surface of the cushion 20 the same distance. According to the invention, a cushion 20 having a hardness which would permit a probe having a contact surface of approximately 1 $mm^2$ to deflect the surface of the cushion 20 by at least 0.25 mm when urged by a force of 10 grams would generally be acceptable. The preferred embodiment of the invention has a hardness such that only 5 grams of force is required to cause a probe having a contact surface of 1 $mm^2$ to deflect the surface of the cushion 20 by at least 0.25 mm.

Preferably, the cushion 20 also provides a high coefficient of friction with the user's finger to permit easy positioning of the control stick 10. The polyurethane foam of the cushion 20 is yielding to a degree dependent upon the thickness of the cushion 20. The thickness of the cushion 20 can easily be modified during manufacture to any desired thickness.

Figure 2:
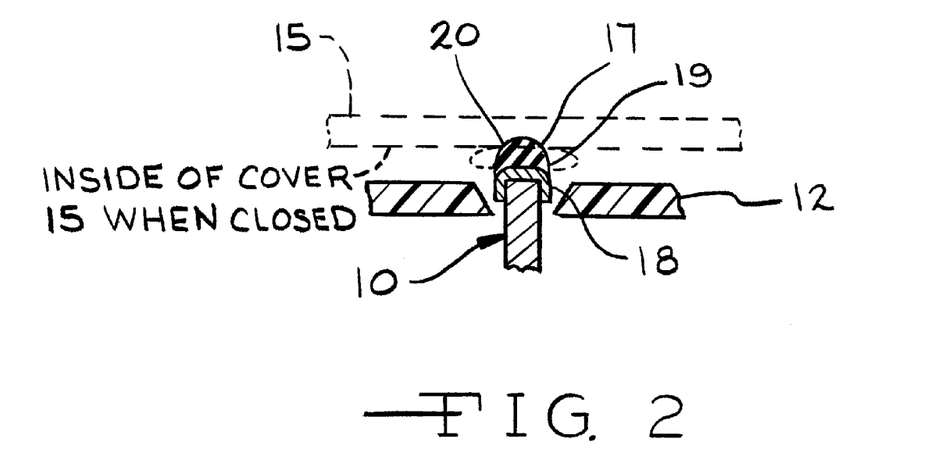
FIG. 2 is a side view, partly in section, of the control stick illustrated in FIG. 1.

Referring to FIG. 2, when the display 15 is folded down over the keyboard 12 for storage, as is typical for most notebook computers, the display 15 may contact the cushion 20. The cushion 20 is flattened as indicated by the phantom line 19, but will resiliently return to the position indicated by the solid outline of the cushion 20. The resiliency of the cushion 20 allows the cap 18 to have an enlarged contact surface area and greater height above the keyboard 12 for increased comfort of the user, without having to increase the spacing between the screen 15 and the keyboard 12. It will be appreciated by those skilled in the art that the cushion 20 will preferably not be made from a material which would damage or stick to the display 15 if the display 15 contacts the cushion 20.

Figure 3:
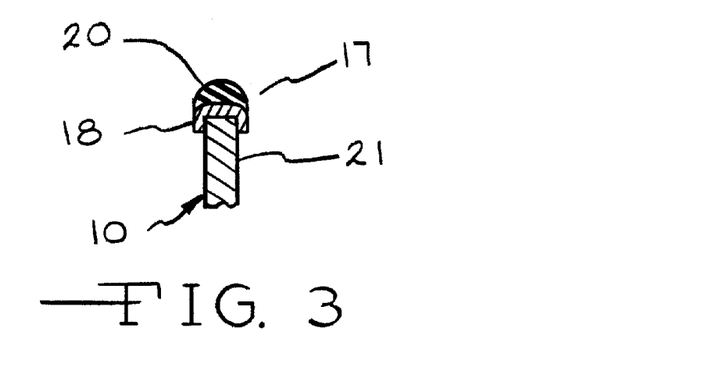
FIG. 3 is an enlarged sectional side view of the cap and the control stick illustrated in FIGS. 1 and 2.
Figure 4:
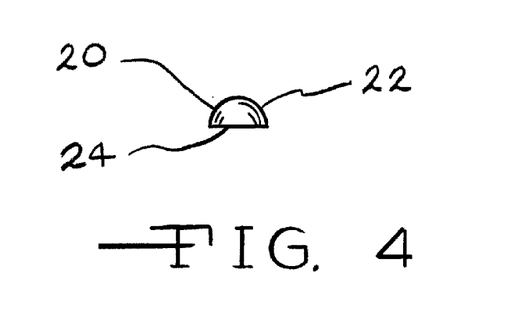
FIG. 4 is a side view of the cushioned cap illustrated in FIGS. 1 through 3.

Referring to FIGS. 3 and 4, the cushion 20 is, preferably, a disk of material having a generally semi-circular cross section. However, the cushion 20 may have any suitable shape, such as that of a flat-ended or hollow-ended cylinder. In the illustrated embodiment, the cushion 20 has a convex end 22, and a second end 24. The convex end 22 is the contact surface of the cushion 20, that is, the surface that the user of the control stick 10 will contact to move the control stick 10. The convex end 22 will generally be a surface providing a good frictional interface. In the preferred embodiment, the convex end 22 is a sealed, smooth, easily cleaned surface, such as a closed cell skin formed on a polyurethane foam. The resiliency of the cushion 20 permits the cushion 20 to be deformed and still provide excellent friction, even when the surface thereof is smooth. However, if desired, the surface of the convex end 22 may be textured or knurled. The second end 24 of the cushion 20 will be attached to the outer surface 19 of the cap 18 on the control stick 10. In the preferred embodiment, a suitable adhesive is used to attach the cushion 20 to the outer surface 19 of the cap 18.

Figure 5:
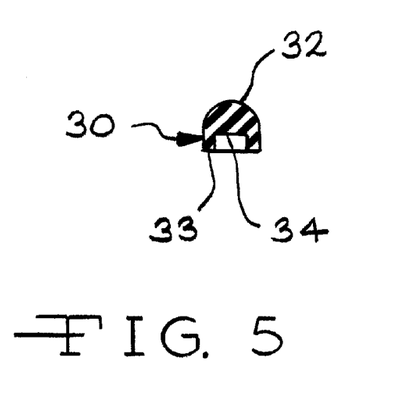
FIG. 5 is a sectional side view of a second embodiment of a cushioned cap in accordance with this disclosure.

FIG. 5 is a sectional view of a second embodiment of the cushion of this invention, indicated generally at 30. The cushion 30 is generally cylindrical and includes a convex end 32, and a relatively flat end 33 opposite the end 32. Although in the illustrated embodiment the end 32 is convex, the end 32 may be formed to any suitable shape, such as a flat or a concave surface, as may the end 22 of the cushion 20.

Figure 6:
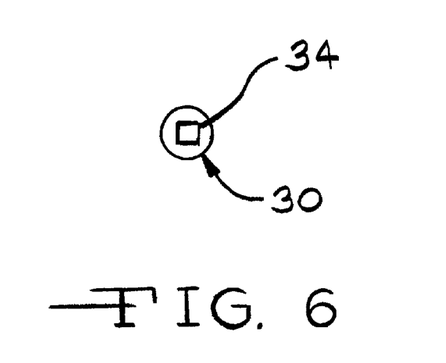
FIG. 6 is a bottom plan view of the cap illustrated in FIG. 5.

A recess 34 is defined in the cushion 30, which generally conforms to the outer surface of the end 21 of the control stick 10. For example, as shown in FIG. 6, the recess 34 may have a square perimeter, if the end 21 of the control stick 10 is square in cross-section. The control stick 10 extends into the recess 34. Preferably, to install the cushion 30 onto the control stick 10, a suitable adhesive is applied to the upper end 21 of the control stick, to the interior surface of the recess 34 in the cushion 30, or to both the upper end 21 of the control stick and to the interior surface of the recess 34 in the cushion 30. The cushion 30 is placed on the end 21 of the control stick 10 so that the cushion 30 adheres to the end 21 of the control stick 10. Of course, the cushion 30 could also be affixed to the control stick 10 by a resilient fit between the recess 34 of the cushion 30 and the end 21 of the control stick 10. The cushion 30 is comprised of a soft material to permit an extended period of time without causing irritation to the finger tissue.

It may be desirable to manufacture the cushion 30 with portions having different levels of hardness. For example, the convex end 32 could be softer than the area of the cushion 30 surrounding the recess 34. The harder area surrounding the recess 34 would assist in retaining the cushion 30 on the control stick 10 by maintaining its form, while the convex end 32 of the cushion could be relatively soft.

One method of manufacturing the cushion 30 with portions having different levels of hardness would involve simultaneously injecting two separate types of material simultaneously into a cavity of single mold to form the cushion 30. For example, a first material having relatively soft properties would be injected in the mold at the area where the convex end 32 is formed, and a second material which is harder than the first material would be injected in the mold at the area where the recess 34 is formed. Accelerating agents, compatabilizing agents, fillers, mold release agents, and coloring agents can be introduced as well, as will be appreciated by those skilled in the art. Somewhere between the two ends 32 and 33, the first and second materials come into contact and become affixed to one another. The cushion 30 would, therefore, be a single structure formed from two different materials, having different hardness characteristics when set or cured. For the purposes of the present invention, curing can be accomplished by using any suitable methods of solidifying or hardening a material, such as for example, by adding or removing heat, inducing a catalytic reaction, or containment for a period of time to allow hardening to occur.

Another method of manufacturing the cushion 30 having multiple areas with different levels of hardness would be to form the cushion 30 from a single material, but altering the setting or formation of the material so that the different areas have different hardness characteristics. This alteration of the formation process can be accomplished by varying the temperature gradient surrounding the mold, creating miniature air pockets within selected portions of the material, or by any other suitable manufacturing process.

As an alternate embodiment, it is contemplated that a cushion of the invention could be formed to completely encompass the cap 18 shown in FIGS. 2 and 3, except where the shaft of the control stick 10 extends outwardly therefrom. Such a cushion would have a cavity therein which includes a flange of material about an opening into the cavity. Such a flange of material would restrict the size of the opening into the cavity to a diameter which is less than the diameter of the cap 18, and thus retain the cushion on the cap 18, either alone or in combination with a suitable adhesive. The opening into such a cushion could be resiliently expanded to slip the cushion onto the cap 18 during assembly, or when the cushion is replaced.

Although the preferred embodiment of the cushion 20 or 30 is for use on a portable notebook computer 14, it is envisioned that the cushion 20 or 30 could be used on any keyboard or in any convenient location on any instrument requiring a control stick-like movement.

It is contemplated that the cushions 20 or 30 of the present invention can 20 be sold separately from a notebook-type portable computer as replacements or substitutes to the original control stick and cap configuration. The cushions 20 or 30 can be sold in a kit form which preferably includes the necessary materials to affix the cushions 20 or 30 to a control stick of a computer. The kit may include a plurality of cushions 20 or 30 and a suitable adhesive material, such as a container of contact cement or a pressure sensitive self-adhesive strip which is pre-applied to the cushions 20 or 30. For example, if contact cement is supplied with the kit, the user simply applies a coating of contact cement to either the originally supplied cap 18 or the end 21 of the control stick 10, depending on the type of cushion 20 or 30 used. A coating of contact cement is also applied to the cushion 20 or 30. The coatings of contact cement are then allowed to dry. The cushion 20 or 30 is then pressed against the coated portion of the original cap 18 or control stick 10, thereby affixing the cushion 20 or 30 to the control stick 10.

Figure 7:
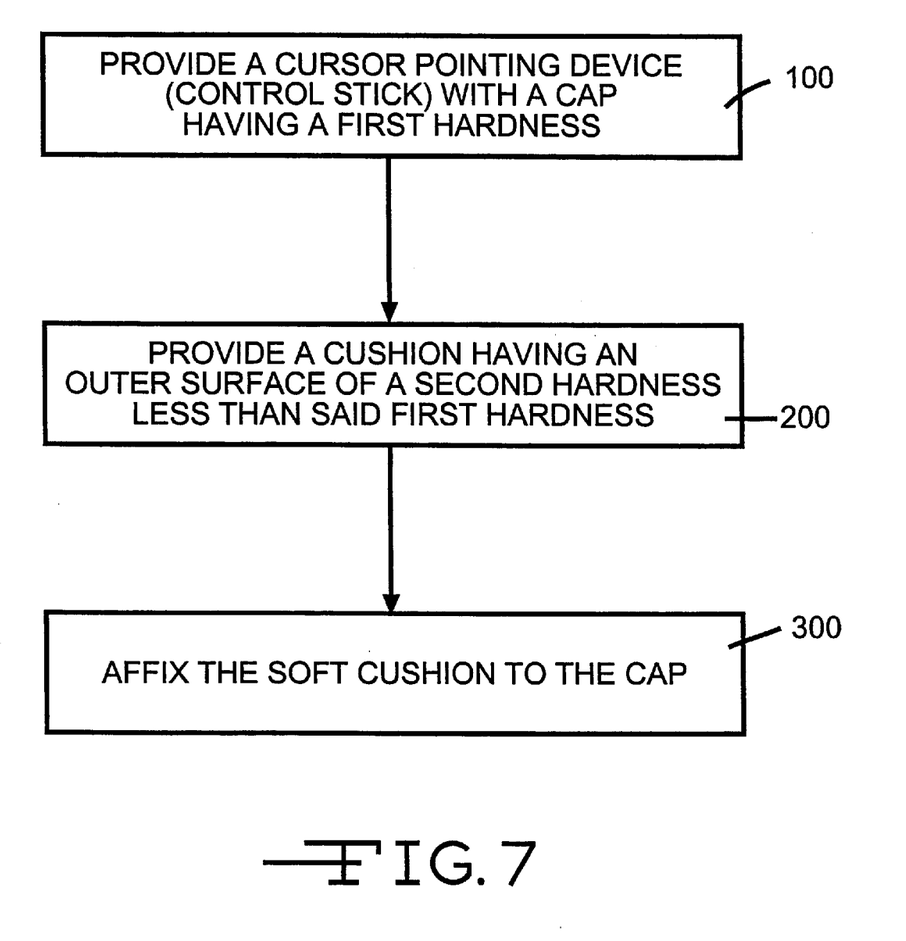
FIG. 7 is a flowchart illustrating a method of manufacturing a control stick in accordance with this disclosure.

FIG. 7 is a flow diagram of a method of forming a cushioned control stick according to the invention. The method of forming a cushioned control stick may be summarized as follows: In a first step 100, a cursor pointing device (control stick) with a cap having a first hardness is provided. In a second step 200, a soft cushion is provided which has an outer surface of a second hardness which is less than the first hardness of the cap (i.e., the cushion is softer than the cap). In a third step 300, the soft cushion is affixed to the relatively harder cap.

It will be appreciated that the soft cushions described above may be formed in a variety of ways, of a variety of materials. For instance, in an embodiment shown in FIG. 8, a cushion 400 is formed of a gel material. As used herein, the term gel means a semi-rigid solid, and includes a colloidal suspension of a solid dispersed in a liquid, and materials with similar characteristics as load bearing surfaces (e.g., stiffness, hardness, malleability, etc.).

Figure 8:
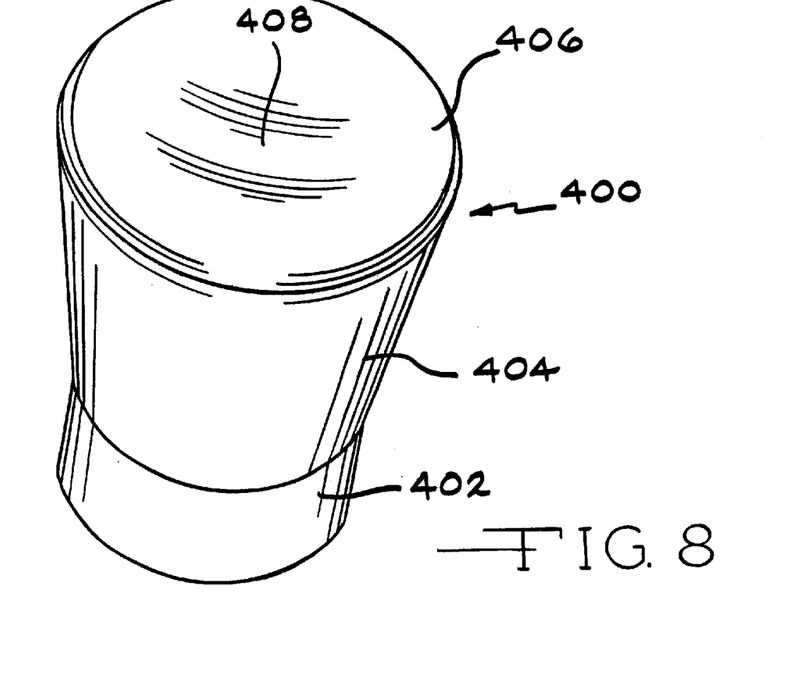
FIG. 8 is perspective view of a gel cushion for a keyboard cursor control stick.

The cushion 400 preferably has a generally cylindrical lower portion 402, and a generally conic upper portion 404, which increases in diameter toward an upper surface 406 of the cushion 400. The upper surface 406 is preferably formed with a depression 408 therein that is suitable to receive a fingertip of a user.

Like the cushions described in the other embodiments above, the cushion 400 will deform when pressed against the computer display screen with it's and will still be safe for the computer video screen 15. It is contemplated that the cushion 400 may be manufactured to have a suitable relatively rigid pocket (seen in FIGS. 9 and 10) to accept the upper end of a control stick of a computer, such as the control stick 10. It is also contemplated that the cushion 400 could otherwise be fixed to a control stick cap like the cap 18 in FIG. 2, such as by adhesively fixing the cushion 400 to the cap. It is also contemplated that the cushion 400 may be manufactured to form an integral part of a removable control stick or portion of a control stick (not shown).

Figure 9:
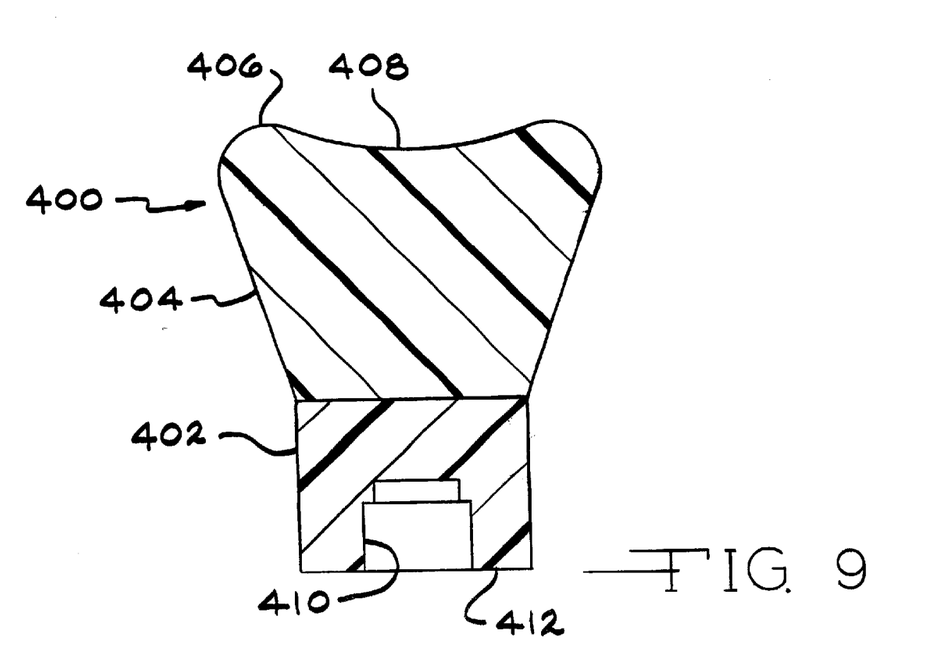
FIG. 9 is a side sectional view of the gel cushion of FIG. 8.

FIG. 9 is a cross sectional view of the cushion 400. The upper portion 404 of the cushion 400 is made from a different material than the lower portion 402. The upper portion 404 may be made from any suitable material. It is believed that thermoplastic elastomeric compounds such as KRATON® thermoplastic elastomers (available from the Royal Dutch/Shell Group) may be particularly suitable for this application. The material from which the upper portion 404 is formed is selected to have a relatively low hardness, so that the upper portion 404 is relatively soft and compliant. Thus the material of the upper portion 404 may be said to be a gel. The lower portion 402 defines a pocket 410 in a lower surface 412 thereof. The pocket 410 is adapted to receive the upper end of a cursor control stick, such as the cursor control stick 10. The lower portion 402 is preferably formed of a material with a higher durometer than the upper portion 404. The lower portion 402 may, nevertheless, be formed of any suitable material. It is believed that thermoplastic rubber compounds such as SANTOPRENE® thermoplastic rubber (available from Advanced Elastomer Systems, L. P., 388 South Main Street, Akron, Ohio, U.S.A. 44311) may be particularly suitable for this application. These thermoplastic elastomeric and rubber materials are believed to be particularly suitable because of the tack their surfaces have, which gives the cushion 400 a smooth, non-irritating, yet non-slip surface for improved performance.

The cushion 400 may be formed by any suitable process on standard thermoplastic equipment. Thermoplastic rubber compounds, for example, can be injection molded, extruded, blow molded and thermoformed with the efficiency and economy associated with thermoplastic materials. In a preferred process, the cushion is formed in a two step injection molding process. In a first step, the lower portion 402 is formed by injection molding. As soon as the lower portion 402 has cured sufficiently to be parted from the mold, the lower portion 402 is placed in a second mold, and the material forming the upper portion 404 is injected into the second mold. The upper portion 404 is thus overmolded onto the lower portion 402, with the material of the upper portion chemically bonding with the material of the lower portion. The completed cushion 400 is then allowed to fully cure.

Figure 10:
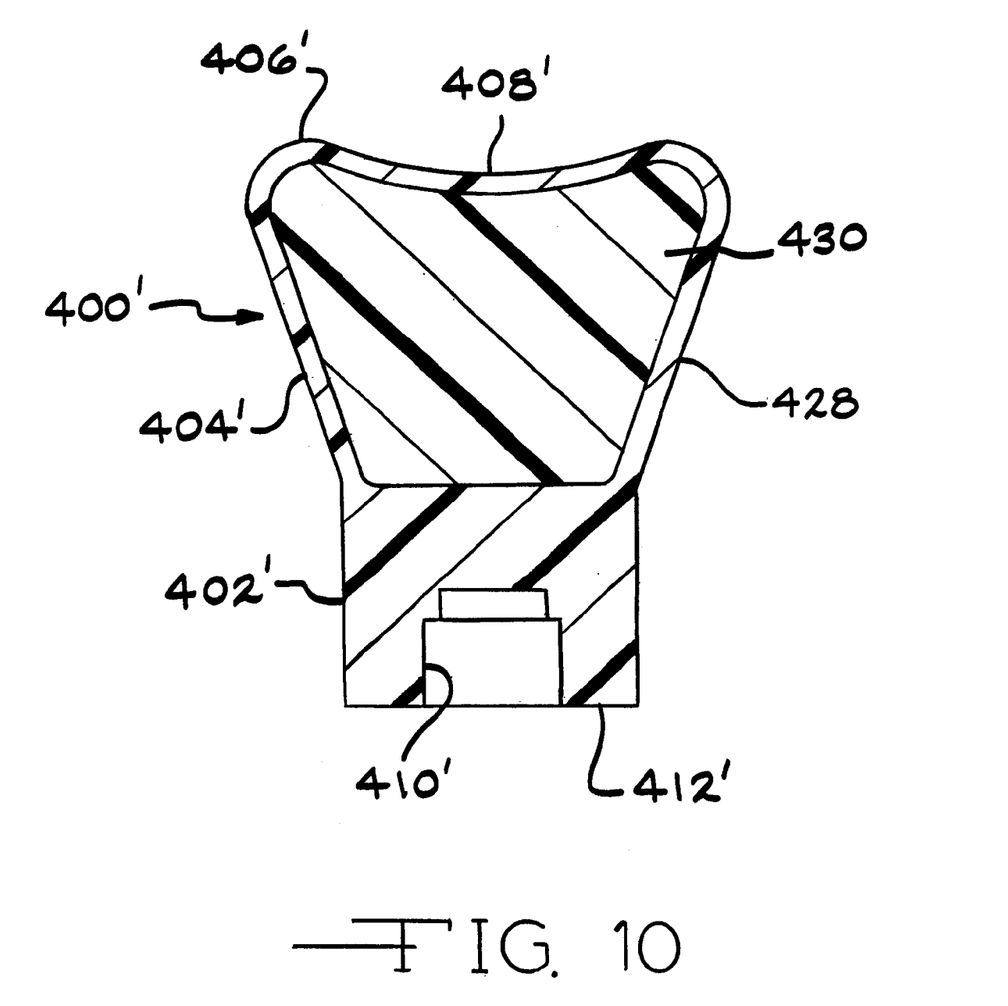
FIG. 10 is a view similar to FIG. 9, except showing an alternate embodiment of the gel cushion.

An alternate embodiment of the cushion 400 is illustrated by the cross sectional view of FIG. 10. A cushion 400' is similar in outer shape to the cushion 400 illustrated in FIG. 8, and has similar qualities of deformation for comfort and protection of computer video screens, and smoothness and tack for ergonomic reasons. However the cushion 400' is constructed somewhat differently, as will be described.

Like the cushion 400, the cushion 400' preferably has a generally cylindrical lower portion 402', and a generally conic upper portion 404', which increases in diameter toward an upper surface 406' of the cushion 400'. The upper surface 406' is preferably formed with a depression 408' therein that is suitable to receive a fingertip of a user.

The lower portion 402' of the cushion 400' is formed of any suitable material, and, like the cushion 400, is preferably formed of a thermoplastic rubber compound such as SANTOPRENET® thermoplastic rubber. The lower portion 402 defines a pocket 410' in a lower surface 412' thereof. The pocket 410', like the pocket 410 in the cushion 400, is adapted to receive the upper end of a cursor control stick, such as the cursor control stick 10.

The upper portion 404' of the cushion 400' is of somewhat different structure that the cushion 400. The outer surface of the upper portion 404' is an envelope 428 which may be formed of any suitable material. It is believed that a thermoplastic rubber compound such as SANTOPRENE® thermoplastic rubber would be suitable in this application, and the envelope 428 is preferably formed integrally with the lower portion 400'. The envelope 428 is filled with a suitable material 430. The material 430 may be any suitable gel, such as a silicone gel, or a thermoplastic elastomeric compound such as KRATON® thermoplastic elastomer formulated to give a very low hardness (i.e., very soft) gel material.

In summary, various aspects of this invention include:

A control stick with a contact surface which is relatively soft and non-irritating to the body tissue of a user.

A cushion for a control stick, the cushion being softer than the control stick.

A cushion for a control stick, the cushion being formed of a gel material softer than the control stick.

A control stick cushion which can contact a display screen of a computer display, deform elastically, and not damage the display screen.

A cap for a control stick, joy stick, or similar device which is soft and non-irritating to the body tissue of a user during extended periods of normal use.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A gel cushion for a control stick of a computer, wherein said cushion has a first end and a second end, said first end of said cushion defining a recess in said cushion, said recess being sized to accommodate at least a portion of said control stick therein, and said second end of said cushion comprising a gel material.

2. The cushion of claim 1, wherein said gel material is selected from the group consisting of silicone gels, thermoplastic rubbers, and thermoplastic elastomers.

3. The cushion of claim 1, wherein said second end has a depression therein that is suitable to receive a fingertip of a user.

4. A method of manufacturing a cushion for a control stick of a computer comprising the steps of:

a. providing a first mold having an internal cavity;

b. placing a first material into said cavity of said first mold to form a first portion of the cushion and allowing the first material to partially cure;

c. providing a second mold having an internal cavity;

d. placing the first material into said cavity of said second mold;

e. injecting a second material into said cavity of said second mold so that said first and second materials come into contact, said second material forming a second portion of the cushion; and f. fully curing said first material and said second material to form said cushion, wherein said first material has a first hardness and said second material has a second hardness which is softer than said first hardness.

5. The method of claim 4, wherein said first material is a thermoplastic rubber compound.

6. The method of claim 4, wherein said second material is a thermoplastic elastomeric compound.

7. A gel cushion for a control stick of a computer, wherein said cushion has a first end and a second end, said first end of said cushion defining a recess in said cushion, said recess being sized to accommodate at least a portion of said control stick therein, and said second end of said cushion comprises an outer envelope containing a gel material.

8. The cushion of claim 7, wherein said gel material is selected from the group consisting of silicone gels, thermoplastic rubbers, and thermoplastic elastomers.

9. The cushion of claim 7, wherein said second end has a depression therein that is suitable to receive a fingertip of a user.

10. The cushion of claim 7, wherein said envelope is formed of thermoplastic rubber.

\* \* \* \* \*